US011813796B2

(12) United States Patent
Enslow et al.

(10) Patent No.: US 11,813,796 B2
(45) Date of Patent: Nov. 14, 2023

(54) 3D PRINTING SYSTEM WITH AGITATION DEVICE

(71) Applicant: 3D Systems, Inc., Rock Hill, SC (US)

(72) Inventors: Andrew Enslow, Escondido, CA (US); Frederick T. Mattern, Portland, OR (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 17/848,452

(22) Filed: Jun. 24, 2022

(65) Prior Publication Data

US 2022/0410478 A1 Dec. 29, 2022

Related U.S. Application Data

(60) Provisional application No. 63/215,160, filed on Jun. 25, 2021.

(51) Int. Cl.
| | |
|---|---|
| *B29C 64/314* | (2017.01) |
| *B29C 64/124* | (2017.01) |
| *B29C 64/255* | (2017.01) |
| *B29C 64/227* | (2017.01) |
| *B33Y 10/00* | (2015.01) |

(Continued)

(52) U.S. Cl.
CPC .......... *B29C 64/314* (2017.08); *B29C 64/124* (2017.08); *B29C 64/227* (2017.08); *B29C 64/255* (2017.08); *B33Y 10/00* (2014.12); *B33Y 30/00* (2014.12); *B33Y 40/10* (2020.01)

(58) Field of Classification Search
CPC ... B29C 64/314; B29C 64/124; B29C 64/227; B29C 64/255; B29C 64/30; B29C 64/35; B33Y 10/00; B33Y 30/00; B33Y 40/10; B33Y 40/00
See application file for complete search history.

(56) References Cited

U.S. PATENT DOCUMENTS

| | | | |
|---|---|---|---|
| 2018/0029311 A1* | 2/2018 | Depalma | B29C 64/255 |
| 2018/0141267 A1* | 5/2018 | Dudley | B29C 64/386 |
| 2020/0070426 A1 | 3/2020 | Chou | |

FOREIGN PATENT DOCUMENTS

EP 3530438 A1 8/2019

OTHER PUBLICATIONS

PCT International Search Report for PCT Application No. PCT/US2022/034819, dated Sep. 30, 2022 (6 pages).

(Continued)

*Primary Examiner* — Michael M. Robinson

(57) ABSTRACT

A three-dimensional (3D) printing system is configured to manufacture a three-dimensional 3D article in a layer-by-layer manner. The 3D printing system includes a resin vessel, a tank agitation subsystem, a fabrication subsystem, and a controller. The resin vessel is configured to contain photocurable resin and has a lower region within a distance H of a bottom surface of the resin vessel. The agitation subsystem includes (a) a grating disposed within the lower region of the resin vessel and (b) an agitation movement mechanism coupled to the grating. The fabrication subsystem is configured to form the 3D article by a layer-by-layer selective curing of the photocurable resin. The controller is configured to operate the agitation movement mechanism to oscillate the grating along a lateral Y-axis to remix filler particulates within the photocurable resin.

18 Claims, 6 Drawing Sheets

(51) Int. Cl.
*B33Y 30/00* (2015.01)
*B33Y 40/10* (2020.01)

(56) References Cited

OTHER PUBLICATIONS

PCT Written Opinion for PCT Application No. PCT/US2022/034819, dated Sep. 30, 2022 (6 pages).

* cited by examiner

3D PRINTING SYSTEM WITH AGITATION DEVICE

CROSS-REFERENCE TO RELATED APPLICATIONS

This non-provisional patent application claims priority to U.S. Provisional Application Ser. No. 63/215,160, Entitled "3D Printing System with Agitation Device" by Andrew Enslow et al., filed on Jun. 25, 2021, incorporated herein by reference under the benefit of U.S.C. 119(e).

FIELD OF THE INVENTION

The present disclosure concerns an apparatus and method for the digital fabrication of three-dimensional (3D) articles by a layer-by-layer solidification of a liquid photocurable build material. More particularly, the present disclosure concerns a 3D printing system having an apparatus to reduce settling of particulate or fibrous fillers in the photocurable build material.

BACKGROUND 3D printing systems are in wide use for prototyping and manufacturing articles. One type of 3D printing system utilizes a process called stereolithography. A typical stereolithography system utilizes a resin vessel, an imaging system, and a build plate within liquid photocurable resin held by the resin vessel. A three-dimensional (3D) article is manufactured in a layer-by-layer manner by selectively imaging and solidifying layers of the photocurable resin over the build plate. Photocurable resins with fillers can present a particular challenge. The fillers can settle over a long period of time which can result in variability in the amount of filler present in the resin or even defects.

SUMMARY

Figure 1:
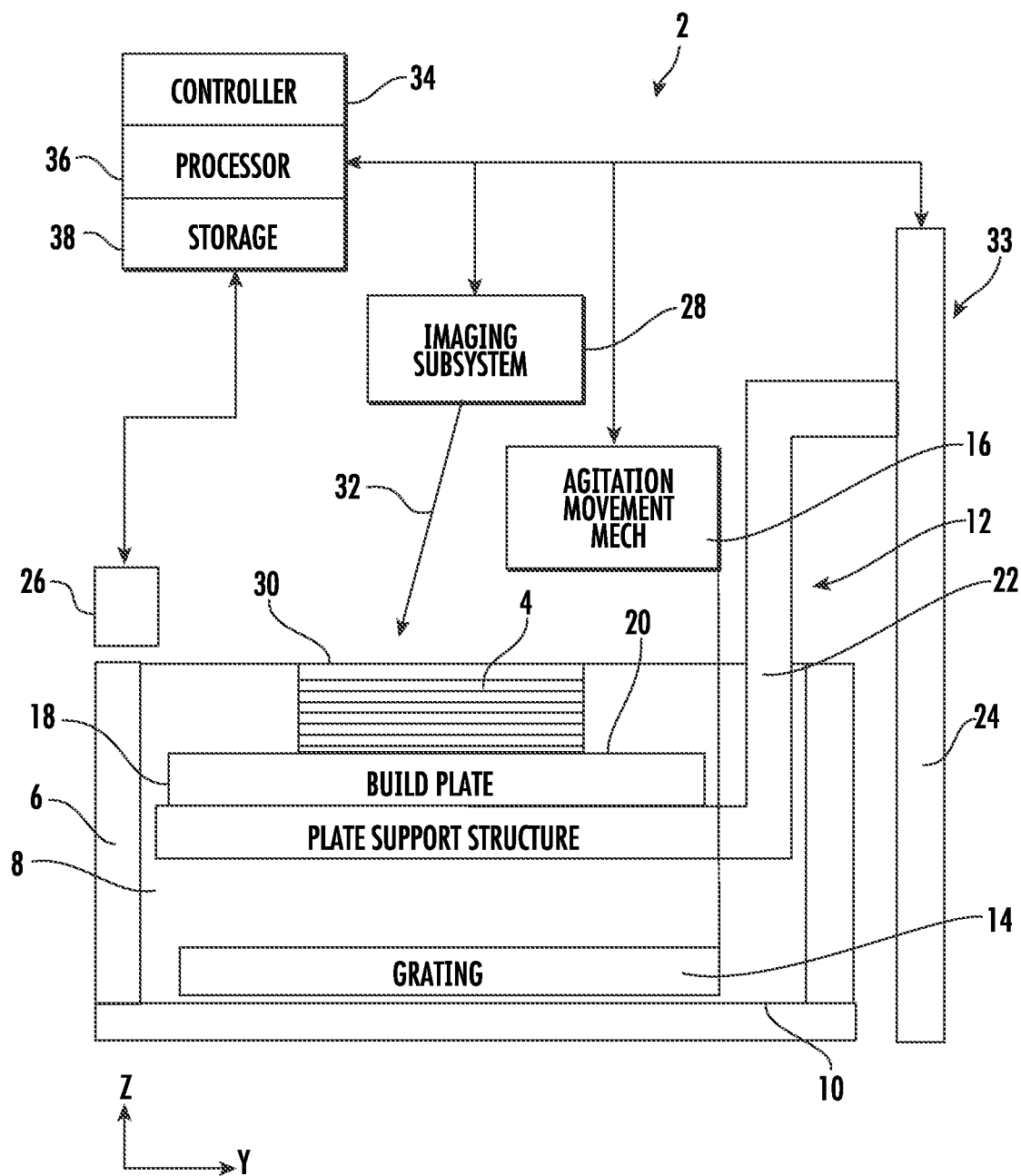
FIG. 1 is a schematic diagram of a three-dimensional (3D) printing system for manufacturing or fabricating a 3D article.

In an aspect of the disclosure, a three-dimensional (3D) printing system is configured to manufacture a three-dimensional 3D article in a layer-by-layer manner. In a manufacturing mode, the 3D printing system forms a vertical stack of plural layers by the selective polymerization of individual layers. The 3D printing system includes a resin vessel, a tank agitation subsystem, a fabrication subsystem, and a controller. The resin vessel is configured to contain photocurable resin and has a lower region within a distance H of a bottom surface of the resin vessel. The agitation subsystem includes (a) a grating disposed within the lower region of the resin vessel and (b) an agitation movement mechanism coupled to the grating. The fabrication subsystem is configured to form the 3D article by a layer-by-layer selective curing of the photocurable resin. The controller is configured to operate the agitation movement mechanism to oscillate the grating along a lateral Y-axis to remix filler particulates within the photocurable resin. When the controller operates the fabrication subsystem, no portion of the fabrication subsystem enters the lower region of the resin vessel. This agitation subsystem, by including a grating that generally matches a geometry of the lower subregion, very efficiently remixes the filler particulates while minimizing unmixed pockets.

In one implementation, the grating includes a plurality of slats that are spaced or arrayed along the lateral Y-axis and have a planar surface that defines an oblique angle with respect to the Y-axis. The oblique angle can fall within a range of 30 to 80 degrees. To maximize remixing efficiency the oblique angle is greater than 45 degrees.

In another implementation, the grating includes a plurality of slats that are spaced or arrayed along the lateral Y-axis and individually have a compound bend geometry. The compound bend geometry includes a bend between two planar surfaces including an upper planar surface and a lower planar surface. The upper planar surface defines an upper angle with respect to the Y-axis. The lower planar surface defines an lower angle with respect to the Y-axis. To improve mixing efficiency, the lower angle is greater than the upper angle. The compound geometry improves bending strength of a slat.

In yet another implementation, the grating includes a plurality of slats that are spaced or arrayed along the lateral Y-axis and with a slat spacing along the Y-axis equal to S. The oscillation of the grating has an amplitude along the Y-axis equal to A. A is greater than S. A can be at least 125% of S or it can be about equal to 150% of S.

In a further implementation, the oscillation has a frequency of at least 100 cycles per minute or in a range of 100-200 cycles per minute. Other frequency ranges are possible depending upon rheological properties of the photocurable resin.

In a yet further implementation, the grating is oscillated along the lateral Y-axis according to the formula: $Y(t) = A*\cos(\omega*t+\delta)$. In this equation, t is time in seconds, $Y(t)$ is a position of the grating along the lateral Y-axis. A is the amplitude of oscillation. The term "cos" is the cosine function having an argument in brackets ( ). The term $\omega$ is an angular frequency equal to $2\pi\nu$. The term $\nu$ is an oscillation frequency and can correspond to or be equal to a motor rotational frequency. The term $\delta$ is a constant that is determined by an initial rotational position of the grating within the range of oscillation along the Y-axis. The value of A can be greater than a spacing S between grating slats. In one illustrative embodiment, A is at least 125% of a slat spacing S or about 1.5 times S. In a specific illustrative embodiment, S is about 40 millimeters and A is about 60 millimeters. In an illustrative embodiment, $\nu$ is at least about 100 revolutions per minute (RPM) or within a range of 150 to 200 RPM.

In another implementation, the grating includes a pair of elongate bars extending along the Y-axis. A plurality of slats are rigidly mounted between the pair of elongate bars. The rigid mounting can be accomplished using welding or screws. Alternatively, the grating with integral elongate bars and slats can be formed with 3D printing.

In yet another implementation, the grating includes a pair of elongate bars extending along the Y-axis. A plurality of slats are rotatively mounted between the pair of elongate bars. The plurality of slats can individually include pins that extend along the X axis from ends of the slats and into the elongate bars. The plurality of slats individually rotate about the pins and therefore rotate about an axis parallel to the X-axis. The plurality of slats can also include tabs or other features that limit rotation the rotation so as to optimize an angular orientation of the slats. Other variations are possible such as slats that rotate about an axis that is oblique with respect to the Y-axis.

DETAILED DESCRIPTION OF THE PREFERRED EMBODIMENTS

FIG. 1 is a schematic diagram of a three-dimensional (3D) printing system 2 for manufacturing a 3D article 4. In describing system 2, mutually orthogonal axes X, Y, and Z will be utilized and otherwise referred to as an X-axis, a Y-axis, and a Z-axis. Axes X and Y are lateral axes that are generally horizontal. The Z-axis is a vertical axis that is generally aligned with a gravitational reference. The term "generally" implies that a direction or magnitude is not necessarily exact but is by design. Thus the term "generally horizontal" means horizontal (perpendicular to a gravitational vector) to within design and manufacturing tolerances. The term "generally aligned" means aligned to within design and manufacturing tolerances.

3D printing system 2 includes a resin vessel 6 for containing a photocurable resin 8. In the illustrated embodiment, photocurable resin 8 includes, inter alia, a monomer, a catalyst, and a filler. The catalyst allows the resin 8 to be hardened and cured with an application of radiation such as blue radiation, violet radiation, or ultraviolet radiation that would typically have a wavelength of less than 450 nm (nanometers). The filler includes insoluble fibers or particulates that typically have a density greater than the bulk density of the resin. The purpose of the filler can be to enhance mechanical, thermal, and/or visual properties of the 3D article 4. With time, the filler will tend to settle in a downward direction, causing the photocurable resin to have a filler content to increase in a -Z direction toward a bottom surface 10 of the resin vessel 6. Eventually the particles will agglomerate together and remixing becomes impossible.

System 2 includes a tank agitation subsystem 12 that further includes a grating 14 coupled to an agitation movement mechanism 16. In the illustrated embodiment, the grating 14 covers a generally rectangular lateral area and is confined to a lower region of vessel 6 that is within a height H of the bottom surface 10. The generally rectangular grating 14 is sized and configured for efficiently agitating the photocurable resin 8 within the vessel 6. When operated, the agitation movement mechanism 16 is configured to move the grating 14 with an oscillatory (back-and-forth) movement having an amplitude A and frequency v. In an illustrative embodiment, the oscillatory movement is sinusoidal.

System 2 includes a build plate 18 with an upper surface 20 upon and above which the 3D article 4 is formed. A build plate support structure 22 supports build plate 18. A vertical movement mechanism 24 is operable to vertically position the build plate support structure 22 and in doing so vertically position the build plate 18. In one embodiment, the vertical movement mechanism 24 includes a fixed motor coupled to a lead screw. The build plate support structure 22 includes a threaded bearing that receives the lead screw. As the motor turns the lead screw, the effect is to translate the build plate support structure 22 up or down.

System 2 includes a material coating subsystem 26 configured to form a thin layer of resin at the upper surface 20 of build plate 18 or the 3D article 4. In one embodiment, the material coating subsystem 26 includes a rubber wiper that is translated along the lateral Y-axis. The material coating subsystem 26 can include a lateral movement mechanism such as a lead screw (operable similar to the vertical movement mechanism) or motor driven belt that provides movement and positioning of the wiper along Y.

System 2 includes an imaging subsystem 28 for selectively hardening a layer of the photocurable resin 8 at a build plane 30. In the illustrated embodiment, the imaging system 28 generates a radiation beam 32 that scans along the build plane 30. The imaging system 28 includes a laser that generates the radiation beam 32 and a pair of galvanometer mirrors for scanning the radiation beam across the build plane 30 along X and Y. The build plate 18, the build plate support structure 22, the vertical movement mechanism 24, the material coating subsystem 26, and the imaging subsystem 28 are collectively referred to as a fabrication subsystem 33.

A controller 34 includes a processor 36 coupled to a non-volatile or non-transient information storage device 38. The processor 36 can otherwise be referred to as a processing unit (PU) or central processing unit (CPU) as are known in the art of computing technology. The non-transient information storage device 38 can include one or more of flash memory and other mass storage devices such as a magnetic disc drive both of which are known in the art of computing technology.

The storage device 38 stores software instructions. The controller 34 is configured to operate the tank agitation subsystem 12 and the fabrication system 33 (but perhaps not both at once) as the processor 36 executes the software instructions. In an embodiment, the controller operates the tank agitation subsystem 12 (oscillates the grating 14) when the fabrication subsystem 33 is dormant (not being operated to fabricate a 3D article 4; except perhaps for vertical movement mechanism 24). The controller operates the fabrication subsystem 33 when the tank agitation subsystem 12 is dormant (except perhaps for vertical movement mechanism 24). In a further embodiment, the tank agitation subsystem 12 can include the vertical movement mechanism 24.

In an embodiment, the controller 34 operates the tank agitation subsystem 12 with the following actions: (a) the controller 34 operates the agitation movement mechanism 16 which oscillates the grating 14 along the Y-axis with amplitude A and periodicity T or frequency v; (b) the controller 34 operates the vertical movement mechanism 24 to move the build plate 18 up and down within the photocurable resin 8 simultaneously with (a). The material coating subsystem 26 and imaging subsystem 28 are dormant while operating the tank agitation subsystem 12.

In an embodiment, the controller 34 operates the fabrication subsystem 33 with the following actions: (a) the controller 34 operates the vertical movement mechanism to position the upper surface 20 (of build plate 18 or previously imaged portion of 3D article 4) proximate to build plane 30, (b) the controller 34 operates the coating subsystem 26 to form a new layer of the photocurable resin over the upper surface 20, (c) the controller operates the imaging subsystem 28 to selectively cure and harden the new layer of photocurable resin, repeats (a)-(c) to complete manufacture of the 3D article 4. During fabrication, the plate support structure 22 does not enter the lower region of the resin vessel 6.

Figure 2:
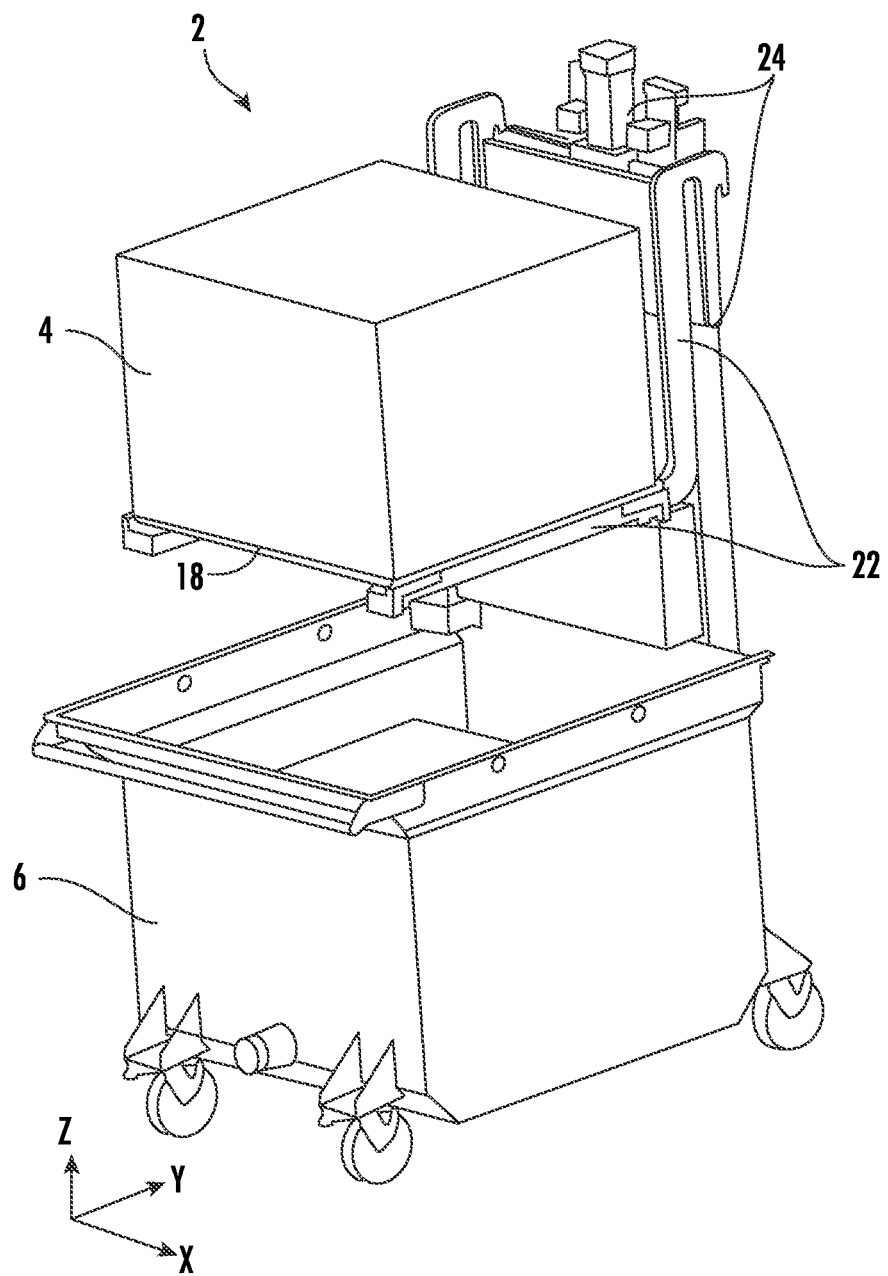
FIG. 2 is an isometric drawing of a portion of a 3D printing system.

FIG. 2 is an isometric drawing of a portion of the three-dimensional (3D) printing system 2. Some features are left out. The resin vessel 6 has a generally rectangular lateral cross-section. In the illustrated embodiment, the vertical movement mechanism 24 includes a motor coupled to a vertical lead screw. The lead screw is threaded into a portion of the build plate support structure 22. Rotation of the motor raises or lowers the build plate support structure 22 depending on a rotational direction of the motor.

Figure 3A:
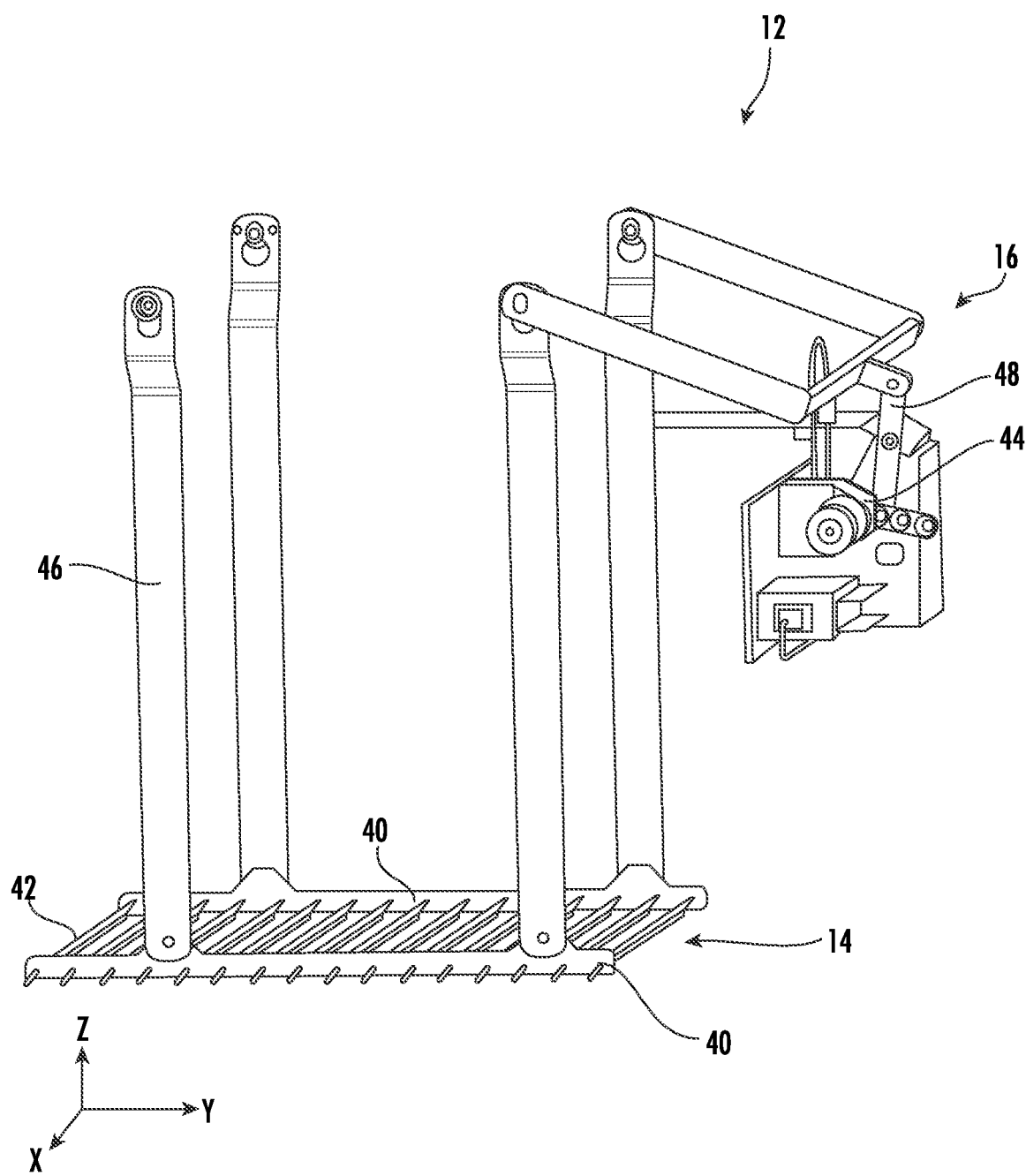
FIG. 3A is an isometric drawing of a tank agitation subsystem in isolation.
Figure 3B:
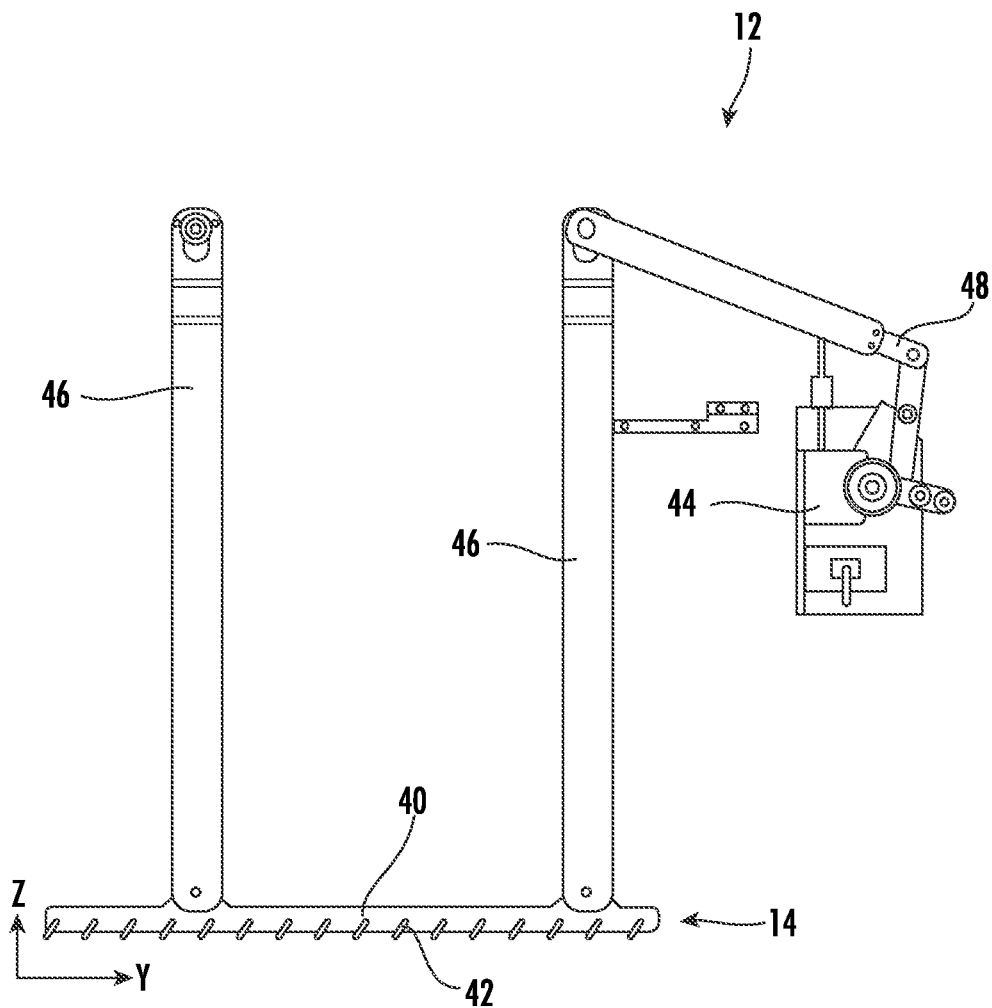
FIG. 3B is a side view of a tank agitation subsystem in isolation.

FIGS. 3A and 3B are isometric and side views of an embodiment of a tank agitation subsystem 12 in isolation. The rectangular grating 14 includes two elongate bars 40 that extend along the Y-axis that support a plurality of slats 42 therebetween. The slats 42 individually have a major axis along the X-axis and are arrayed along the Y-axis. In an alternative embodiment, the slats can individually have a major axis that defines an oblique angle with respect to the X-axis and Y-axis.

In a first embodiment, the slats 42 are rigidly mounted to the two elongate bars 40. The slats 42 can be welded to the elongate bars 40 or attached to the elongate bars 40 with a plurality of screws. Alternatively, the combination of the elongate bars 40 and the slats 42 can be 3D printed as one integral unit.

In a second embodiment, the slats 42 are rotatively mounted to the two elongate bars 40. The rotative mounting of the slats 42 can include pins that extend from ends of the slats 42 and into the elongate bars 40 along the X-axis. The mounting can also include tabs or other features that limit rotation of the slats 42 with respect to the elongate bars 40 to optimize the effect of the slats 42 on agitation and mixing of the photocurable resin 8.

The agitation movement mechanism 16 includes a motor 44 coupled to four support bars 46 by a linkage 48. One 360 degree rotation of the motor causes the rectangular grating 14 to oscillate once back and forth with an amplitude of oscillation A along the Y-axis. Rotating the motor with frequency ν results in the grating oscillating back and forth sinusoidally along the Y-axis with frequency ν.

Figure 4:
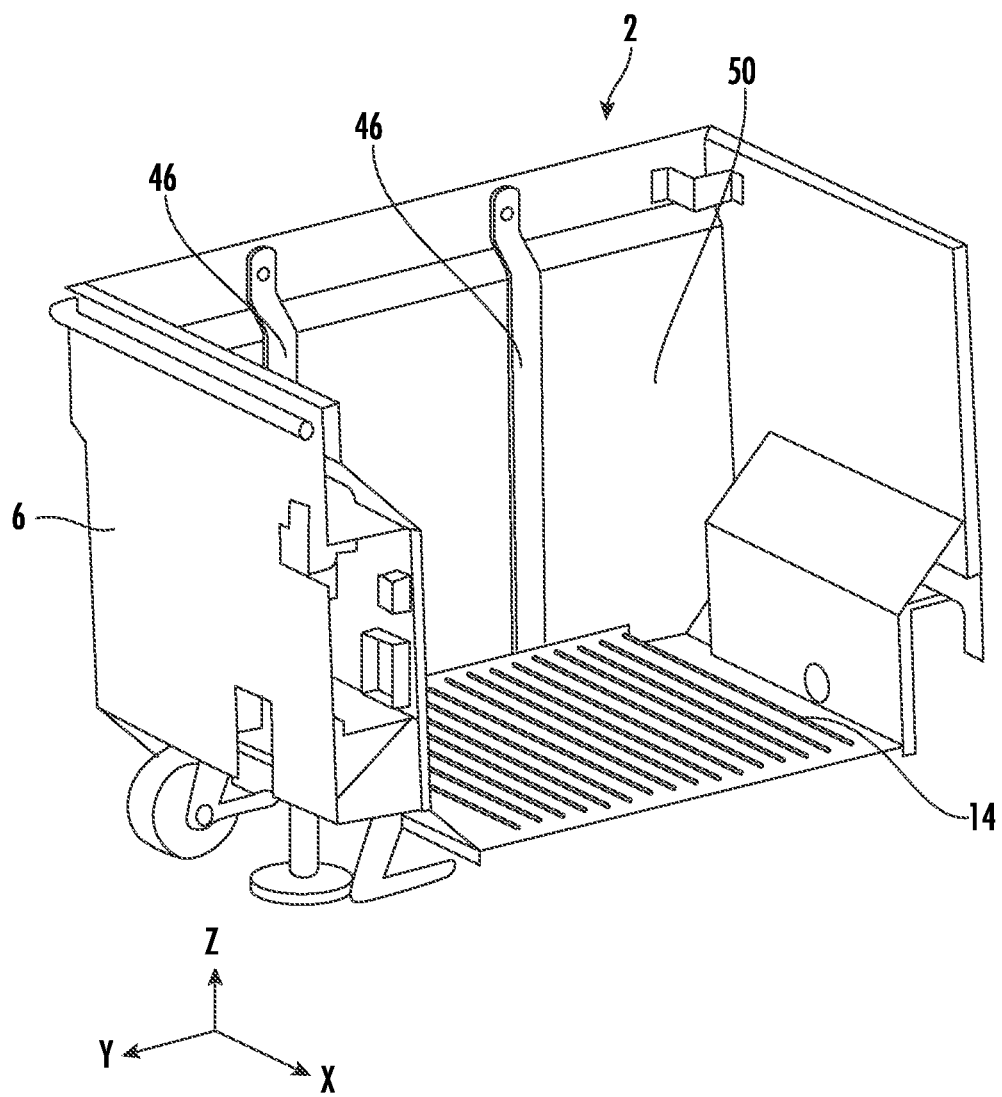
FIG. 4 is an isometric view of a portion of a 3D printing system.

FIG. 4 is an isometric cutaway view of a portion of system 2 including vessel 6 with a portion of the tank agitation subsystem 12 installed. As seen, the support bars 46 extend vertically along an inside edge of walls 50 to the rectangular grate 14.

Figure 5A:
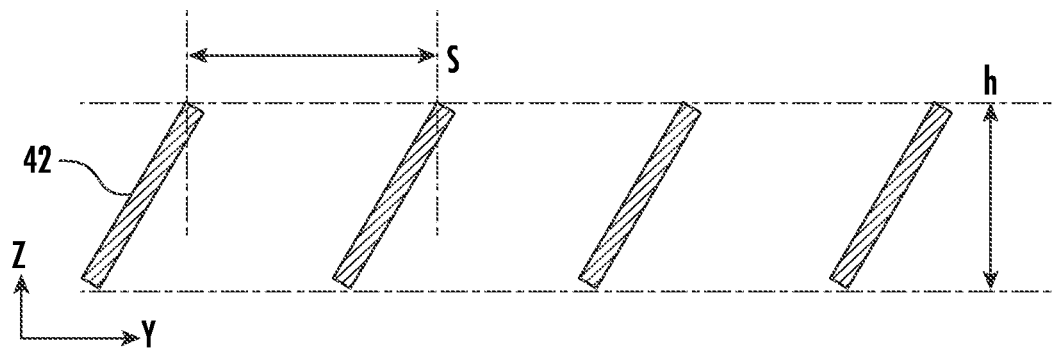
FIG. 5A is an edge view of a first embodiment of slats that form a portion of a grating.

FIG. 5A is an edge view of a first embodiment of slats 42 viewed or looking along the X-axis. The slats 42 are generally planar or paralepidid in shape. A major axis of slat 42 is along X and a slat plane defines an oblique angle with respect to the lateral Y-axis. In the illustrated embodiment, the angle is about 60 degrees. However, the angle with respect to the Y axis can vary between 30 and 80 degrees or between 30 and 70 degrees or between 30 and 60 degrees. To maximize mixing efficiency the angle is greater than 45 degrees or in a range of 45 to 80 degrees.

Figure 5B:
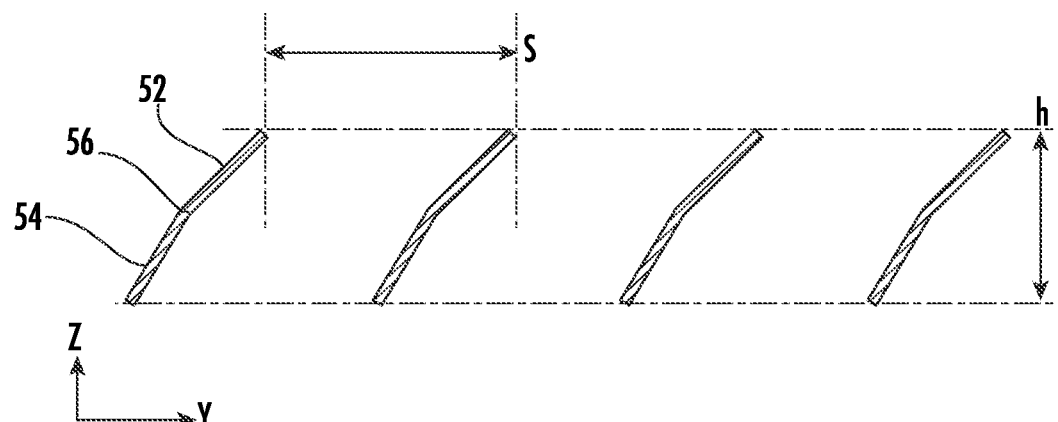
FIG. 5B is an edge view of a second embodiment of slats that form a portion of a grating.

FIG. 5B is similar to FIG. 5A except that the slats 42 are compound slats 42. The slats 42 include two planar surfaces (52 and 54) separated by a bend 56. Having the bend 56 stiffens the slats 42 and therefore allows for a use of thinner material.

The two planar surfaces (52 and 54) include an upper planar surface 52 that defines an upper oblique angle with respect to the Y-axis and a lower planar surface 54 that defines a lower oblique angle with respect to the Y-axis. In the illustrated embodiment, the lower oblique angle is greater than the upper oblique angle. This relationship of upper and lower oblique angles improve mixing efficiency of the grating 14. In the illustrated embodiment, the upper oblique angle is about 45 degrees and the lower oblique angle is about 60 degrees.

The slat spacing is S and a slat height is h. In an illustrative embodiment, the slat height h is about 20 millimeters. In general, the height h is preferably greater than 15 millimeters in order to provide sufficient agitation. A value of h greater than 20 millimeters is better for agitation but comes at a cost of the grating 14 occupying a greater volume of the vessel 8.

The oscillation of the grating 14 is along Y and preferably has an amplitude A that is greater than S to assure sufficient agitational fluid motion. Preferably A is at least 125% or S or is about 150% of S. In an illustrative embodiment, the parameters include: h generally equals 20 millimeters, S generally equals 40 millimeters, and A generally equals 60 millimeters.

The oscillation frequency ν is at least about 100 revolutions per minute (RPM) or within a range of 150 to 200 RPM. One revolution is tantamount to moving grate 14 back and forth along the Y-axis by the distance A (the amplitude).

The specific embodiments and applications thereof described above are for illustrative purposes only and do not preclude modifications and variations encompassed by the scope of the following claims.

What is claimed:

1. A three-dimensional (3D) printing system for manufacturing a 3D article comprising:
   a vessel configured to contain photocurable resin, the vessel having a lower region within a distance of H of a bottom surface of the vessel;
   a tank agitation subsystem including:
   a grating disposed within the lower region; and
   an agitation movement mechanism coupled to the grating;
   a fabrication subsystem configured to form the 3D article by a layer-by-layer selective curing of the photocurable resin; and
   a controller configured to operate the agitation movement mechanism to oscillate the grating along Y-axis and to remix filler particulates within the photocurable resin, wherein the oscillation has a frequency of at least 100 cycles per minute.

2. The three-dimensional (3D) printing system of claim 1 wherein the grating includes a pair of elongate bars extending along the Y axis and a plurality of slats that are rigidly mounted between the pair of elongate bars.

3. The three-dimensional (3D) printing system of claim 1 wherein the grating includes a pair of elongate bars extending along the Y axis and a plurality of slats that are rotatively mounted between the pair of elongate bars.

4. A three-dimensional (3D) printing system for manufacturing a 3D article comprising:
   a vessel configured to contain photocurable resin, the vessel having a lower region within a distance of H of a bottom surface of the vessel;
   a tank agitation subsystem including:
   a grating disposed within the lower region; and
   an agitation movement mechanism coupled to the grating;
   a fabrication subsystem configured to form the 3D article by a layer-by-layer selective curing of the photocurable resin; and
   a controller configured to operate the agitation movement mechanism to oscillate the grating along Y-axis and to remix filler particulates within the photocurable resin.

5. The three-dimensional (3D) printing system of claim 4 wherein the plurality of slats individually have at least one planar surface defining an oblique angle with respect to the Y-axis, the angle having a magnitude within a range of 30 to 80 degrees.

6. The three-dimensional (3D) printing system of claim 4 wherein the slats have a slat spacing defined therebetween, the oscillation of the grating along the Y-axis having an amplitude that is greater than the slat spacing.

7. The three-dimensional (3D) printing system of claim 6 wherein the amplitude is at least 125% of the slat spacing.

8. The three-dimensional (3D) printing system of claim 4 wherein the slats extend over a vertical height that is greater than 15 millimeters.

9. The three-dimensional (3D) printing system of claim 4 wherein the slats individually have a bend between two generally planar surfaces including an upper planar surface and a lower planar surface.

10. The three-dimensional (3D) printing system of claim 9 wherein the upper planar surface defines an upper angle with respect to the Y-axis and the lower surface defines a lower angle with respect to the Y-axis, the lower angle is greater than the upper angle.

11. A method of operating a 3D printing system comprising:
providing:
a vessel configured to contain photocurable resin, the vessel having a lower region within a distance of H of a bottom surface of the vessel;
a tank agitation subsystem including:
a grating disposed within the lower region;
an agitation movement mechanism coupled to the grating system; and
a fabrication system configured to form the 3D article by a layer-by-layer curing of the photocurable resin; and
operating the agitation movement mechanism to oscillate the grating along an Y-axis and to remix filler particulates within the photocurable resin, wherein the oscillation has a frequency of at least 100 cycles per minute.

12. A method of operating a 3D printing system comprising:
providing:
a vessel configured to contain photocurable resin, the vessel having a lower region within a distance of H of a bottom surface of the vessel;
a tank agitation subsystem including:
a grating disposed within the lower region;
an agitation movement mechanism coupled to the grating system; and
a fabrication system configured to form the 3D article by a layer-by-layer curing of the photocurable resin; and
operating the agitation movement mechanism to oscillate the grating along an Y-axis and to remix filler particulates within the photocurable resin, wherein the grating includes a plurality of slats that are spaced along the Y-axis.

13. The method of claim 12 wherein the plurality of slats individually have at least one planar surface defining an oblique angle with respect to the Y-axis, the angle having a magnitude within a range of 30 to 80 degrees.

14. The method of claim 12 the oscillation of the grating along the Y-axis having an amplitude that is greater than the slat spacing.

15. The method of claim 12 wherein the slats extend over a vertical height that is greater than 15 millimeters.

16. The method of claim 12 wherein the slats individually have a bend between two generally planar surfaces including an upper planar surface and a lower planar surface.

17. The method of claim 12 wherein the upper portion defines an upper angle with respect to the Y-axis and the lower portion defines a lower angle with respect to the Y-axis, the lower angle is greater than the upper angle.

18. The method of claim 12 wherein the slats individually define a major axis along an axis X that is perpendicular to the Y-axis.

\* \* \* \* \*